United States Patent
Groell et al.

(10) Patent No.: US 6,922,904 B2
(45) Date of Patent: Aug. 2, 2005

(54) METHOD AND SYSTEM FOR ANALYZING TRANSMITTED SIGNALS FROM A PROBE SYSTEM

(75) Inventors: Klaus Groell, Waging am See (DE); Christian Eisenberger, Ruhpolding (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/767,080

(22) Filed: Jan. 29, 2004

(65) Prior Publication Data

US 2005/0072015 A1 Apr. 7, 2005

(30) Foreign Application Priority Data

Jan. 29, 2003 (DE) .......................... 103 04 195
Jan. 29, 2003 (DE) .......................... 103 04 193

(51) Int. Cl.[7] .............................................. G01B 5/008
(52) U.S. Cl. ....................... 33/558; 33/503; 33/556; 33/561; 702/168; 702/95
(58) Field of Search ................. 33/556–561, 503, 33/DIG. 3; 702/27–28, 150–153, 95, 172; 455/39, 67.1, 500, 67.7; 700/80, 195, 262

(56) References Cited

U.S. PATENT DOCUMENTS

| 5,862,604 | A | | 1/1999 | Fuchs et al. |
| 6,154,713 | A | * | 11/2000 | Peter et al. .................. 702/95 |
| RE37,030 | E | * | 1/2001 | Lloyd et al. .................. 33/559 |
| 6,301,796 | B1 | * | 10/2001 | Cresson ........................ 33/556 |
| 6,366,831 | B1 | * | 4/2002 | Raab .......................... 700/262 |
| 6,470,587 | B1 | * | 10/2002 | Cunningham et al. ........ 33/557 |
| 6,487,785 | B1 | | 12/2002 | Ritz |
| 6,526,670 | B1 | * | 3/2003 | Carli ........................... 33/503 |
| 6,643,944 | B2 | * | 11/2003 | Yoda et al. ................... 33/558 |
| 6,665,945 | B2 | | 12/2003 | Hagl et al. |
| 6,839,563 | B1 | * | 1/2005 | Kirby et al. ................. 455/500 |
| 2004/0040373 | A1 | * | 3/2004 | Saito .......................... 33/558 |

FOREIGN PATENT DOCUMENTS

| DE | 199 29 557 | 1/2001 |
| DE | 101 32 554 | 1/2003 |
| EP | 1 014 582 | 6/2000 |
| WO | WO 99/41856 | 8/1999 |
| WO | WO 00/70298 | 11/2000 |

* cited by examiner

*Primary Examiner*—Christopher W. Fulton
*Assistant Examiner*—Yaritza Guadalupe
(74) *Attorney, Agent, or Firm*—Kenyon & Kenyon

(57) ABSTRACT

A method and a system is for evaluating the transmitted signals of a probe system, which has a probe element that is deflectable out of a rest position and which generates transmitted signals, which include a switch-on signal during a deflection of the probe element out of its rest position and which, together with interference signals, are transmitted to a receiving unit, in which the received signals made up of the transmitted signals and the interference signals, are compared to a reference signal. In this context, the reference signal is formed by interlinking information signals generated from the received signals, and the interference signals, and/or the received signals are differentiated by time, prior to the comparison with the reference signal.

70 Claims, 6 Drawing Sheets

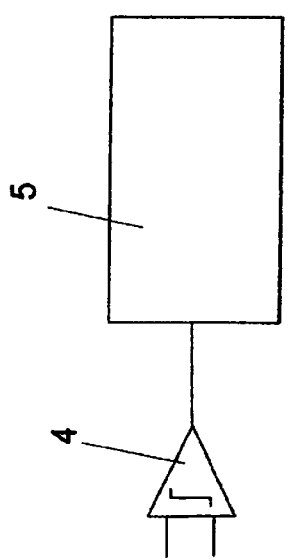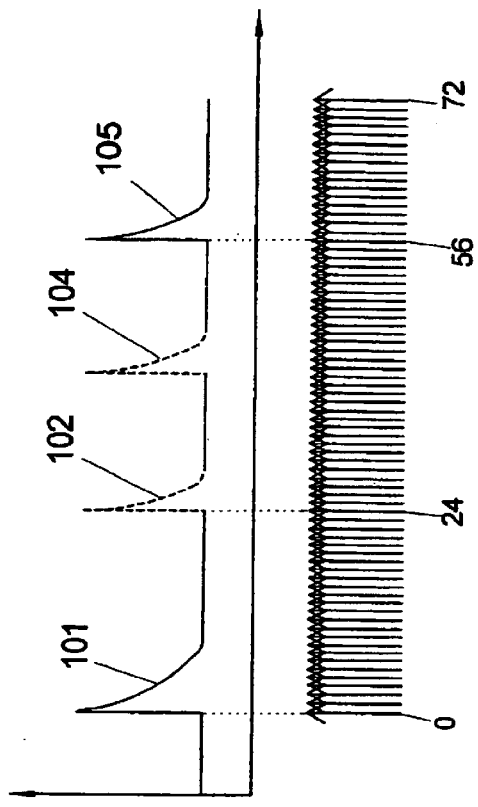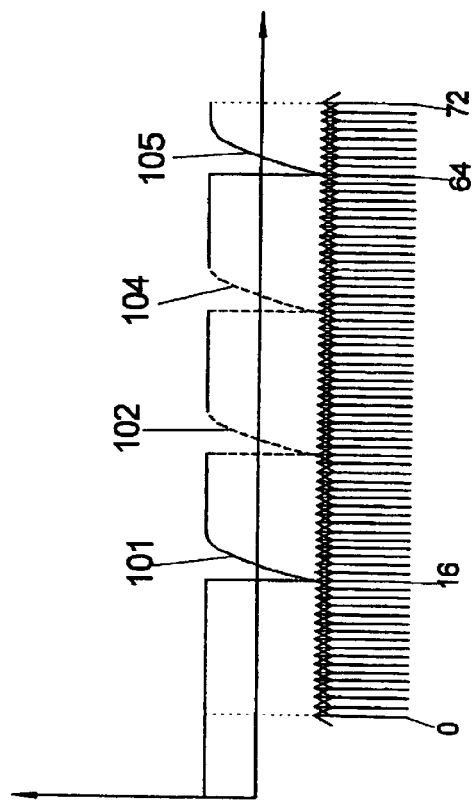

METHOD AND SYSTEM FOR ANALYZING TRANSMITTED SIGNALS FROM A PROBE SYSTEM

CROSS-REFERENCE TO RELATED APPLICATIONS

The present application claims priority to Application No. 103 04 193.1, filed in the Federal Republic of Germany on Jan. 29, 2003, and to Application No. 103 04 195.8, filed in the Federal Republic of Germany on Jan. 29, 2003, each of which is expressly incorporated herein in its entirety by reference thereto.

FIELD OF THE INVENTION

The present invention is directed to a method for analyzing transmitted signals from a probe system and to a system for that purpose.

BACKGROUND INFORMATION

What is concerned here is the evaluation of the transmitted signals (output signals) of a probe system, which, on a measuring probe, has a probe element that is deflectable out of its rest position and which, in response to a deflection of the probe element out of its rest position, generates a switch-on signal. Probe systems of this kind are used for determining the position of workpieces which are clamped in material-working machines, such as milling machines. The rest position of the probe element is understood to be a position in which the probe element does not have any contact with a workpiece. When the probe element makes contact with the workpiece, it is deflected out of its rest position.

To determine whether the probe element is deflected out of its rest position, a suitable detector system is used, and, as a function of the signals generated on the part of this detector system, the probe system delivers its transmission signals. Reference is made to German Published Patent Application No. 101 32 554.

In so-called wireless probe systems, the relevant switch-on signal is transmitted as an electromagnetic signal, e.g., as an infrared signal, to a receiving unit. In this receiving unit, the transmitted signals of the probe system are analyzed in order to ascertain the occurrence of switch-on signals (thus a deflection of the probe element). In this connection, in order to be able to differentiate the switch-on signal (and, if indicated, other relevant transmitted signals of the probe system, such as a battery signal) from interference signals (caused, for example, by the infrared component of dimmed neon tubes), the signals (received signals) received by the receiving unit are compared to a reference signal, and only those signals which exceed a signal threshold defined by the reference signal are further processed. Such a method and a corresponding circuit arrangement are described in International Published Patent Application No. WO 99/41856.

In this context, it is becoming increasingly more difficult to distinguish between transmitted signals of the probe system relevant to the analysis, and interference signals, because a data exchange between the probe system and the corresponding receiving unit is required over ever greater distances and, associated with this is also often a corresponding enlargement of the solid angle within which the transmitted signals are radiated.

It is an aspect of the present invention to provide a method and a system of the type mentioned at the outset, which may provide an enhanced differentiation between transmitted signals of the probe system and interference signals.

SUMMARY

The above and other beneficial aspects of the present invention may be achieved by providing a system and method as described herein.

A first aspect of the present invention provides for the reference signal to be generated by combining information signals, which include, e.g., the peak values of the (if indicated, differentiated) received signals, with interference signals that are superposed on the transmitted signal and are received by the receiving unit assigned to the probe system.

Based on the reference signal formed, which defines a signal threshold that is used as a basis for distinguishing the transmitted signals of the probe system from interference signals, by combining the received signals of the probe system with the interference signals, it is possible to ensure that the signal threshold has a value that is not (or in any case very seldom) exceeded by the interference signals. This may prevent interference signals from being mistakenly identified as transmitted signals of the probe system.

The reference signal generated by combining the information signals with the interference signals may be between the amplitude (i.e., envelope) of the transmitted signals and the amplitude (i.e., envelope) of the reference signals, the amplitude of the interference signals being smaller than that of the transmitted signals.

The information signals and the interference signals may be linked, e.g., in an additive or subtractive process, e.g., by mean value generation, in that all signals received by the receiving unit are combined with one another following a specific rule. In this manner, both the transmitted signals of the probe system, as well as the interference signals are included and considered.

Prior to the linking operation, an effective value may be generated in each case, e.g., in accordance with an envelope of the particular signal, both for the information signals, as well as for the interference signals.

To form effective values of the individual signals, as well as to combine the signals, on the one hand, analog circuits, such as capacitor circuits or a voltage divider, may be used, the information signals, e.g., being derived from the received signals by the capacitor circuit used for forming the effective value. On the other hand, a digital circuit may also be used for this purpose, e.g., with the aid of a programmable logic module or a microprocessor.

In the result, based on the different typical frequencies of the (higher-frequency) transmitted signals, on the one hand, and the (lower-frequency) interference signals, on the other hand, the differentiated received signals are separated (e.g., by two capacitor circuits) into information signals, which may include the differentiated transmitted signals, and into the comparatively lower-frequency interference signals. In the process, an effective value may be simultaneously formed for the information signals (in accordance with the peaks of the differentiated received signals) and for the interference signals (in accordance with an envelope of the interference signals).

Another aspect of the present invention may provide for the received signals of the probe system (in the receiving unit) to be differentiated by time, in a differentiator, prior to the comparison with the reference signal.

By differentiating the received signals, low-frequency interferences, which occur, for example, in rooms or spaces illuminated by neon tubes, may be eliminated, the analysis method being substantially enhanced in the process with respect to its insensitivity to interference.

Moreover, differentiation of the received signals offers the possibility of distinguishing the transmitted signals from the interference signals on the basis of the position of the edges of the received signals. This is explained in greater detail below.

The transmitted signals of the probe system, e.g., the switch-on signals, may be generated by substantially square-wave signal pulses, the received signals being differentiated with the goal of determining the signal edges of the signal pulses, and both the signal edges having a positive slope, as well as the signal edges having a negative slope being subsequently evaluated.

In an example embodiment of the present invention, the transmitted signals may be generated by a sequence of signal packets, each signal packet having a start signal and a stop signal, and a switch-on signal occurring between the start and the stop signal during each deflection of the probe element out of its rest position.

By determining the temporal position of the ascending and descending signal edges of the start and stop signals which have predefined characteristic intervals, the occurrence of start and stop signals at regular intervals may be determined. This may make it possible to reliably distinguish signal packets limited by start and stop signals, from interference signals which do not exhibit any comparable regularity. Because the switch-on signals are emitted in response to each deflection of the probe element, in turn, at a defined position between a start and a stop signal, they are also able to be clearly identified on the basis of the position of their edges with respect to the start and stop signals. The same holds for battery signals or other relevant transmitted signals of the probe system. This may make it possible to further enhance the process of distinguishing the transmitted signals of the probe system relevant to the analysis, from interfering background signals.

The electromagnetic transmitted signals (infrared signals) of the probe system, as well as the corresponding interference signals (thus the received signals) are converted in the assigned receiving unit, prior to the differentiation operation, by an optoelectronic element, e.g., in the form of a photodiode, into electric signals (voltage signals), so that the signal processing and analysis in the receiving unit are carried out in the receiving unit on the basis of the electric signals.

The reference signal, which corresponds, e.g., to a reference voltage and which defines the signal thresholds on whose basis the transmitted signals of the probe system are identifiable, may be generated from the differentiated received signals themselves (converted into electric signals), in that information signals generated from the differentiated received signals are combined with the interference signals. In this context, the information signals are generated in such a manner that they may include only the peak values of those components of the differentiated received signals which originate from the transmitted signals. The operation of interlinking the information signals and the interference signals to produce a reference signal may be carried out, e.g., by mean value generation, e.g., by using an electric voltage divider.

To evaluate the received signals, which are considered as relevant to the analysis following a comparison with the reference signal, a high-speed semiconductor memory in the form of a shift register may be used. It evaluates the received signal at a multiplicity of sampling locations, to determine the position of the edges of the relevant signal pulses (which form the transmitted signal). The position of the sampling locations is defined in this context by a periodic sampling signal, whose frequency is many times greater than the signal rate of the pulses of the transmitted signal. In this manner, the position of the edges may be ascertained precisely enough.

As an alternative to using analog circuits (electric voltage dividers, capacitor circuit) to form the reference signal, a digital circuit may also be used, e.g., with the aid of a programmable logic module or a microprocessor.

As an alternative to using a shift register, a programmable logic module or a microprocessor may also be used, in order to ascertain the edges of the received signal within the framework of a digital circuit.

Thus, from the regular occurrence of start and stop signals, which are identifiable on the basis of the characteristic position of their signal edges to one another, the method of an example embodiment of the present invention may make it possible to infer the readiness of the probe system when this system regularly sends out signal packets to this effect in the readiness state. When, in addition, the switch-on signals generated in response to each deflection of the probe element are sent out in each instance in a defined interval between a start and a stop signal, then these signals are also able to be reliably identified on the basis of the characteristic position of their edges within a signal packet. The same holds for battery signals to possibly be emitted, which, for example, indicate the need to replace the battery of the probe system. In this context, the transmitted signals of the probe system, on the one hand, and interference signals, on the other hand, are reliably differentiated by forming a reference signal, which, in an example embodiment of the present invention, considers the amplitude of both the transmitted signals, as well as of the interference signals.

An exceptional reliability of the method may be achieved when, following differentiation of the received signals, the signal edges having a positive and negative slope are each processed and analyzed in a separate circuit.

A system for analyzing the transmitted signals of a probe system, which is suited, e.g., for implementing the method of the present invention, is described below.

In an example embodiment of the present invention, a method for evaluating transmitted signals of a probe system, the probe system including a probe element deflectable from a rest position, includes generating the transmitted signals by the probe element, the transmitted signals including a switch-on signal during a deflection of the probe element out of the rest position, receiving the transmitted signals and interference signals by a receiver unit, generating information signals from the signals received in the receiving step, forming a reference signal by interlinking the information signals with the interference signals, and comparing the transmitted signals and the interference signals received in the receiving step to the reference signal.

The reference signal may be formed in the forming step by interlinking the information signals with the interference signals in at least one of an additive process and a subtractive process.

The interlinking of the information signals and the interference signals may include a mean value generation, and the mean value generation may be performed by a voltage divider.

The interlinking of the information signals and the interference signals may include linking the information signals to an effective value of the interference signals. The effective value of the interference signals may be formed in accordance with an envelope of the interference signals. The interlinking of the information signals and the interference signals may include forming an effective value of the information signals in accordance with an envelope of the signals received in the receiving step. A capacitor circuit may be arranged to form at least one of the effective value of the interference signals and the effective value of the information signals.

The reference signal may be formed in the forming step by at least one of a digital circuit, a programmable logic module and a microprocessor.

The method may include differentiating the signals received in the receiving step by time prior to the comparing step. The signals received in the receiving step may be differentiated in the differentiating step prior to the reference signal forming step. The method may include generating information signals from the differentiated received signals, and the reference signal may be formed in the forming step by interlinking the information signals with the interference signals.

The method may include evaluating signal edges of the differentiated received signals having a positive slope and signal edges of the differentiated received signals having a negative slope by comparison with a reference signal to determine a position of the signal edges.

At least one of the transmitted signals and the switch-on signals may include substantially square-wave signal pulses.

The transmitted signals may be generated in the generating step by generating a sequence of signal packets, each signal packet including a start signal and a stop signal, the switch-on signal between the start signal and the stop signal during deflection of the probe element from the rest position.

The transmitted signals may be generated in the generating step by generating a sequence of signal packets, each signal packet including a start signal and a stop signal, the switch-on signal between the start signal and the stop signal during deflection of the probe element from the rest position, and the method may further include ascertaining occurrence of the start signal, the stop signal and the switch-on signal in accordance with the position of ascending and descending signal edges of the transmitted signals.

The transmitted signals may include electromagnetic signals, e.g., infrared signals.

The method may include further processing transmitted signals received in the receiving step that exceed a signal threshold predefined in accordance with the reference signal.

The method may include evaluating the transmitted signals received in the receiving step to determine a position of edges of the transmitted signals following the comparing step performed at a plurality of sampling locations arranged in temporal succession. The sampling locations may be arrange in accordance with a periodic sampling signal, a frequency of which is greater than a signal rate of the transmitted signals.

The evaluating step is performed by at least one of a semiconductor memory, a shift register, a digital circuit, a microprocessor and a programmable logic module.

The method may include, after the differentiating step, processing and evaluating in separate electric circuits, descending and ascending edges of the transmitted signals received in the receiving step.

In accordance with an example embodiment of the present invention, a system for analyzing received signals in a probe system, the probe system including a measuring probe having a probe element deflectable from a rest position, the measuring probe configured to generate transmitted signals as a function of deflection of the probe element, may include a receiver unit configured to receive the received signals, including the transmitted signals and interference signals, an arrangement configured to generate information signals from the received signals, an arrangement configured to interlink the information signals with the interference signals to form a reference signal, and an arrangement configured to compare the received signals to the reference signal.

The arrangement configured to interlink the information signals with the interference signals may be configured to interlink the information signals with the interference signals at least one additively and subtractively.

The interlink may include mean value generation.

The arrangement configured to interlink the information signals with the interference signals may be configured to interlink an effective value of the information signals to an effective value of the interference signals. The effective value of the information signals may correspond to peak values of the received signals. The effective value of the interference signals may correspond to an envelope of the interference signals.

The system may include a differentiator configured to differentiate the received signals by time, the differentiator connected to an input of the arrangement configured to compare the received signals to the reference signal. The differentiator may be connected to an input of the arrangement configured to interlink the information signals with the interference signals, the arrangement configured to interlink the information signals with the interference signals configured to interlink differentiated received signals.

The receiver unit may be configured to receive electromagnetic transmitted signals of the measuring probe, and the system may include an arrangement configured to convert the electromagnetic received signals into electric signals. The electromagnetic transmitted signals may include infrared signals. The arrangement configured to convert the electromagnetic received signals into electric signals may include an optoelectronic component.

The system may include an analog circuit configured to process and analyze the received signals connected to an output of the arrangement configured to convert the electromagnetic received signals into electric signals.

The system may include a digital circuit configured to process and analyze the received signals connected to an output of the arrangement configured to convert the electromagnetic received signals into electric signals. The digital circuit may include at least one of a programmable logic module and a microprocessor.

The system may include an arrangement configured to determine a position of edges of the received signals arranged downstream from the arrangement configured to compare the received signals to the reference signal. The arrangement configured to determine the position of edges of the received signals may include at least one of a shift register, a microprocessor and a programmable logic module.

In accordance with an example embodiment of the present invention, a method is for evaluating transmitted signals of a probe system, the probe system including a probe element deflectable from a rest position. The method may include generating the transmitted signals by the probe element, the transmitted signals including a switch-on signal during deflection of the probe element from the rest position, receiving the transmitted signals and interference signals by a receiving unit, differentiating the received signals by time, and after the differentiating step, comparing the received signals, including the transmitted signals and the interference signals, to a reference signal.

The transmitted signals may include substantially square-wave signal pulses.

The transmitted signals may include a sequence of signal packets, each signal packet including a start signal and a stop signal, the switch-on signal between the start signal and the stop signal during deflection of the probe element from the rest position.

The method may include determining a position of signal edges by differentiation of the received signals, and evaluating signal edges having a positive slop and signal edges having a negative slope by comparison with a reference value. The method may include ascertaining occurrence of the start signal and the stop signal by determining a temporal position of ascending and descending signal edges.

The transmitted signals may include electromagnetic signals, e.g., infrared signals.

The method may include forming the reference signal in accordance with the received signals, and the reference signal may be formed in the reference signal forming step in accordance with interlinking the differentiated received signals and the interference signal superposed on the transmitted signals. The interlinking of the differentiated received signals may include interlinking the differentiated received signals to an effective value of the interference signals.

The method may include generating information signals in accordance with the interlinked differentiated received signals and interference signals, and the information signals may include components of the differentiated signals made up of differentiated transmitted signals.

The method may include forming at least one of the effective value of the interference signals by a capacitor circuit and an effective value of information signals by a capacitor circuit.

The interlinking of the differentiated signals and the interference signal to produce the reference signal may include mean value generation performed by a voltage divider.

The reference signal may be formed in the forming step by at least one of a digital circuit and a programmable logic module.

The method may include further evaluating differentiated received signals that exceed a signal threshold predefined in accordance with the received signal.

The method may include, after the comparing step, evaluating the differentiated received signals at a plurality of sampling locations arranged in temporal succession to determine a position of edges of the received signals. The sampling locations may be arranged in accordance with a periodic sampling signal having a frequency greater than a signal rate of the transmitted signals.

The evaluating step may be performed in accordance with at least one of a semiconductor memory, a shift register, a digital circuit, a microprocessor and a programmable logic module.

The method may include processing and analyzing in separate electric circuits descending and ascending signal edges of the received signals following the differentiating of the received signals.

In accordance with an example embodiment of the present invention, a system for analyzing received signals may include a probe system including a measuring probe and a receiver unit, the measuring probe including a probe element that is deflectable from a rest position, the measuring probe configured to generate transmitted signals in accordance with deflection of the probe element, the receiver unit including an arrangement configured to receive the received signals, the received signals including transmitted signals and interference signals, the receiver unit including an arrangement configured to compare the received signals to a reference signal, the receiver unit including a differentiator connected to an input of the arrangement configured to compare the received signals to the reference signal, the differentiator configured to differentiate the received signals by time.

The receiver unit may be configured to receive electromagnetic received signals of the measuring probe, the receiver unit including an arrangement configured to convert the electromagnetic received signals into electric signals. The electromagnetic received signals may include infrared signals.

The arrangement configured to convert the electromagnetic signals into electric signals may include an optoelectronic component.

The system may include an analog circuit configured to process and analyze the received signals connected to an output of the arrangement configured to convert the electromagnetic signals into electric signals.

The system may include a digital circuit configured to process and analyze the received signals connected to an output of the arrangement configured to convert the electromagnetic signals into electric signals. The digital circuit may include at least one of a programmable logic module and a microprocessor.

The system may include an arrangement configured to interlink the differentiated received signals and interference signals superposed on the received signal to form the reference signal. The interlink may include mean value generation.

The system may include an arrangement configured to determine a position of edges of the received signals arranged downstream from the arrangement configured to compare the received signals to the reference signal. The arrangement configured to determine the position of edges of the received signals may include at least one of a shift register, a microprocessor and a programmable logic module.

Example embodiments of the system are described below. With respect to aspects and features of this system, reference is made to the explanations pertaining to the method.

BRIEF DESCRIPTION OF THE DRAWINGS

FIGS. 6a and 6b illustrate another work step used in evaluating the transmitted signals of the probe system in the receiving unit.

DETAILED DESCRIPTION

Figure 1:
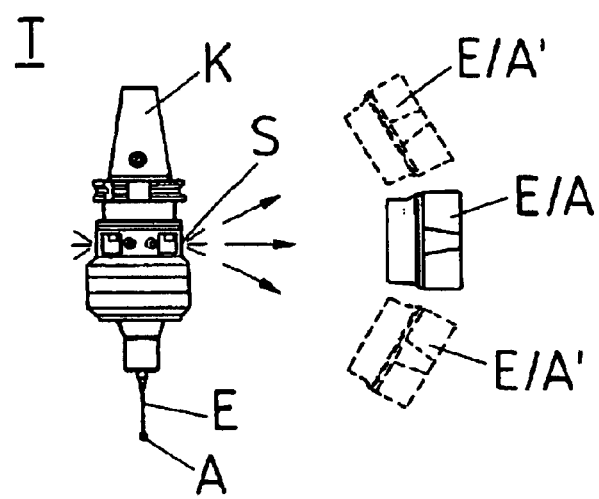
FIG. 1 is a schematic view of a probe system having an assigned receiving unit for analyzing the transmitted signals generated by the probe system.

FIG. 1 illustrates a probe system T, which is used to determine the position and contour of a workpiece clamped in a machine tool, for example, a milling machine and, to this end, includes a measuring probe. Through the use of a cone K, the measuring probe is insertable into a spindle of the particular machine tool.

At its end opposing cone K, probe system T has a probe element E in the form of a feeler having a probing contact sphere A, which is movably supported in all directions on the housing of the probe system. Typically, the rest position of probe element E is on the axis of symmetry of probe system T, as illustrated in FIG. 1. When probing contact sphere A of probe element E makes contact with a workpiece clamped in the machine tool in question, probe element E is deflected out of its rest position. This deflection is recorded by a detector system of the probe system.

Figure 2:
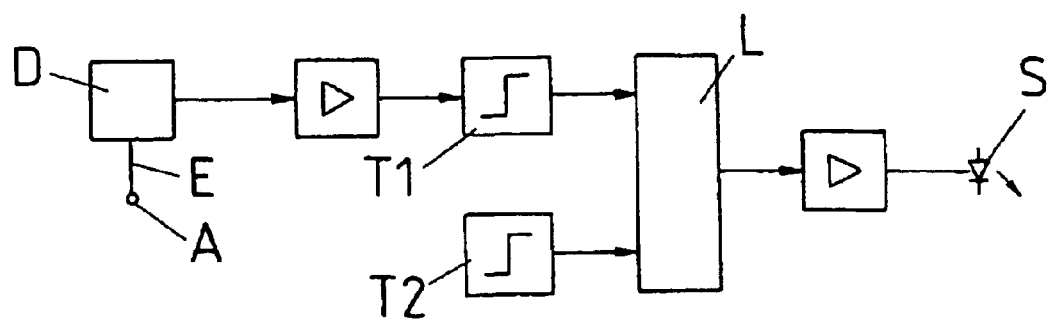
FIG. 2 is a block diagram of the probe system illustrated in FIG. 1.

For this purpose, as illustrated in FIG. 2, the probe system has a detector system D, which is assigned to probe element E and is used to record a deflection of probe element E, for example, by an optical transmitter (in the form of an LED) and an assigned sensor (in the form of a differential photo-element). For further details with regard to the possible design of probe system T, reference is made, for example, to German Published Patent Application No. 199 29 557.

The output voltage produced by detector system D as a function of the deflection of probe element E is amplified and supplied to a trigger T1. As a further input signal, trigger T1 contains a reference voltage, which is supplied, for example, by a programmable logic module L. The reference voltage defines the switching threshold above which the output voltage of the amplifier connected in outgoing circuit to detector system D, is considered to be indicative of a deflection of probe element E.

In response to the occurrence of a voltage above the switching threshold, a corresponding infrared signal (switch-on signal) is transmitted by logic module L via an IR transmitter S provided for this purpose, of the probe system, to an associated receiving and evaluation unit E/A (cf. FIG. 1). A second trigger T2 assigned to logic module L of the probe system is used for monitoring the battery voltage and provides for a battery signal to be delivered to the associated receiving and evaluation unit E/A when it is necessary to change batteries in the probe system.

FIG. 1 illustrates different possible configurations of the receiving and evaluation unit E/A with respect to the measuring probe of probe system T, particularly with respect to its IR transmitter S. As illustrated in FIG. 1, the possible transmission angles of transmitter S uniformly formed on the periphery of the housing of probe system T are alternatively 0°, +30° or −30°.

Figure 3B:
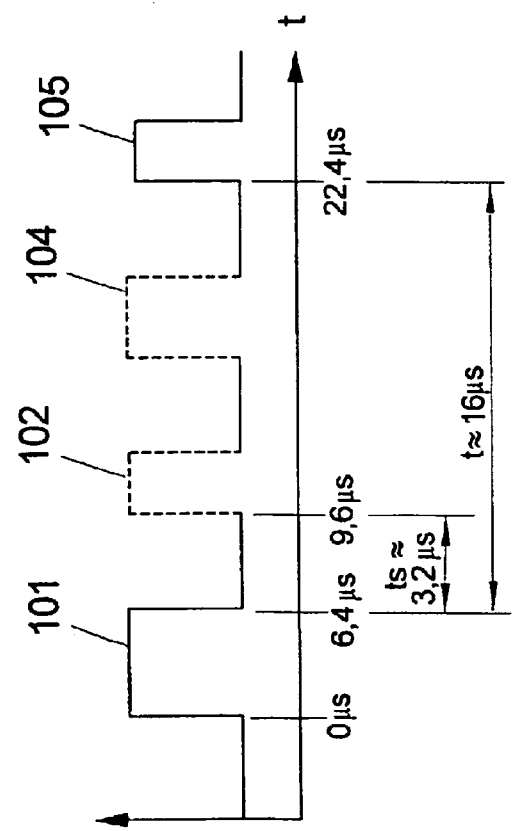
FIGS. 3a and 3b are schematic views of the transmitted signals generated by the probe system.
Figure 3A:
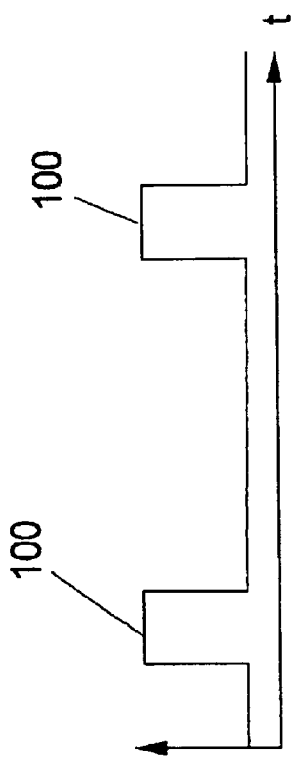

As illustrated in FIG. 3a, probe system T, when in a state of readiness, regularly delivers data packets in time intervals of about 3 ms to the associated receiving unit. As illustrated in FIG. 3b, these data packets, produced by IR radiation, are composed of a multiplicity of square-wave signal pulses, namely a start bit 101 and a stop bit 105, between which there may still be a switch-on signal 102 and a battery signal 104. In other words, in the readiness state of the probe system, data packets 100, which each have a start bit 101 and a stop bit 105, are regularly sent out, there being a defined time span of 16 As between the end of start bit 101 and the beginning of the particular stop bit 105. If a deflection of the probe element is ascertained by the probe system, then a switch-on signal 102 occurs between start bit 101 and stop bit 105 in a defined time interval from the falling edge of start bit (3.2 µs). Moreover, between start bit 101 and stop bit 105, a battery signal 104 may be provided to indicate when it is necessary to change the battery of the probe system.

The probe system, introduced here and illustrated on the basis of FIGS. 1 to 3b, having a deflectable probe element and an associated receiving unit may be conventional. Reference is made, for instance, to German Published Patent Application No. 199 29 557.

The following describes in greater detail the design of the receiving unit, as well as the evaluation of the transmitted signals of the probe system in the receiving unit.

Here, the receiving unit assigned to the probe system includes, as a receiver, a photodiode 1 having a downstream amplifier 10, as well as a differentiator element 2, which is downstream from photodiode 1, and another downstream amplifier 20. Two identical evaluation circuits 3, 3' are positioned downstream from differentiator element 2 and amplifier 20, an inverter 25 being connected in incoming circuit to second evaluation circuit 3'.

Each of the two evaluation circuits 3, 3' is used for comparing the signal differentiated by differentiator 2, with a reference signal, in a trigger 4, and for evaluating such signals, which exceed a threshold value defined by the reference signal (in the form of a reference voltage) in a shift register 5.

To generate a reference voltage starting out from the output voltage of differentiator 2 having downstream amplifier 20, each of the two circuits 3, 3' in a first branch has an electrical component 30, e.g., in the form of a diode, which is only transmissive to electric signals, when the input-side voltage is greater than the output-side voltage that is falling off at a downstream capacitor 31 and may discharge, in turn, across a resistor 32. In this context, the electrical components of capacitor circuit 30, 31, 32 are selected, e.g., with respect to the decay time of the capacitor, which may be 15 ms, for example, in a manner that allows capacitor circuit 30, 31, 32 to attain its maximum effectiveness in response to high-frequency signals (which are transmitted to a downstream amplifier 33). This concerns, above all, the transmitted signals of the measuring probe. Typically, the level of these differentiated transmitted signals is distinctly higher than the level of the differentiated interference signals.

In a second branch, the particular evaluation circuit 3, 3' has another electrical component 35 (in the form of a diode), which is only transmissive to electric signals, when the input-side voltage is greater than the output-side voltage that is falling off at a downstream capacitor 36 and may discharge, in turn, across a resistor 37. An electrical resistor 5a is connected between each electrical component 35 and capacitor 36 connected downstream from component 35. This resistor 35a is selected such that capacitor 36 (decay time 21 ms, for example) is not able to be charged by data packets 100 generated by the probe system (cf. FIGS. 3a and 3b), but only by interference signals which extend over a longer time period in comparison to the data packets and/or which have a lower frequency. That is, electric resistor 35a connected in incoming circuit to capacitor 36 causes a delay in the reaction time of the evaluation circuit, so that very short signal packets 100, which are sent out by the probe system, do not effect any significant charging of capacitor 36 in question. For that reason, the capacitor is essentially only charged by the comparatively lower-frequency interference signals which are produced, for example, by the infrared component of fluorescent tubes.

Thus, by the two capacitor circuits 30, 31, 32 and 35, 35a, 36, 37, the differentiated received signals are separated into information signals, which substantially include the differentiated transmitted signals, and into the comparatively lower-frequency interference signals. In the process, an effective value for the information signals (in accordance with the peaks of the differentiated received signals) and for the interference signals (in accordance with an envelope of the interference signals) is simultaneously formed, as will be described in the following.

An amplifier 33 and 38, respectively, is connected in outgoing circuit to the two capacitor circuits 30, 31, 32 and 35, 35a, 36, 37, the first-mentioned amplifier having the amplification factor one, and the second-mentioned amplifier an amplification factor greater than one.

Via amplifiers 33, 38, the two branches of the particular evaluation circuit 3, 3' are connected to a voltage divider 39, which is made up of two resistors. The voltage tapped off by this voltage divider is fed to the one input of the particular trigger 4, at whose other input the output signal of differentiator 2 is applied. A shift register 5 is connected in outgoing circuit to trigger 4 of the particular evaluation circuit 3, 3'.

Figure 4:
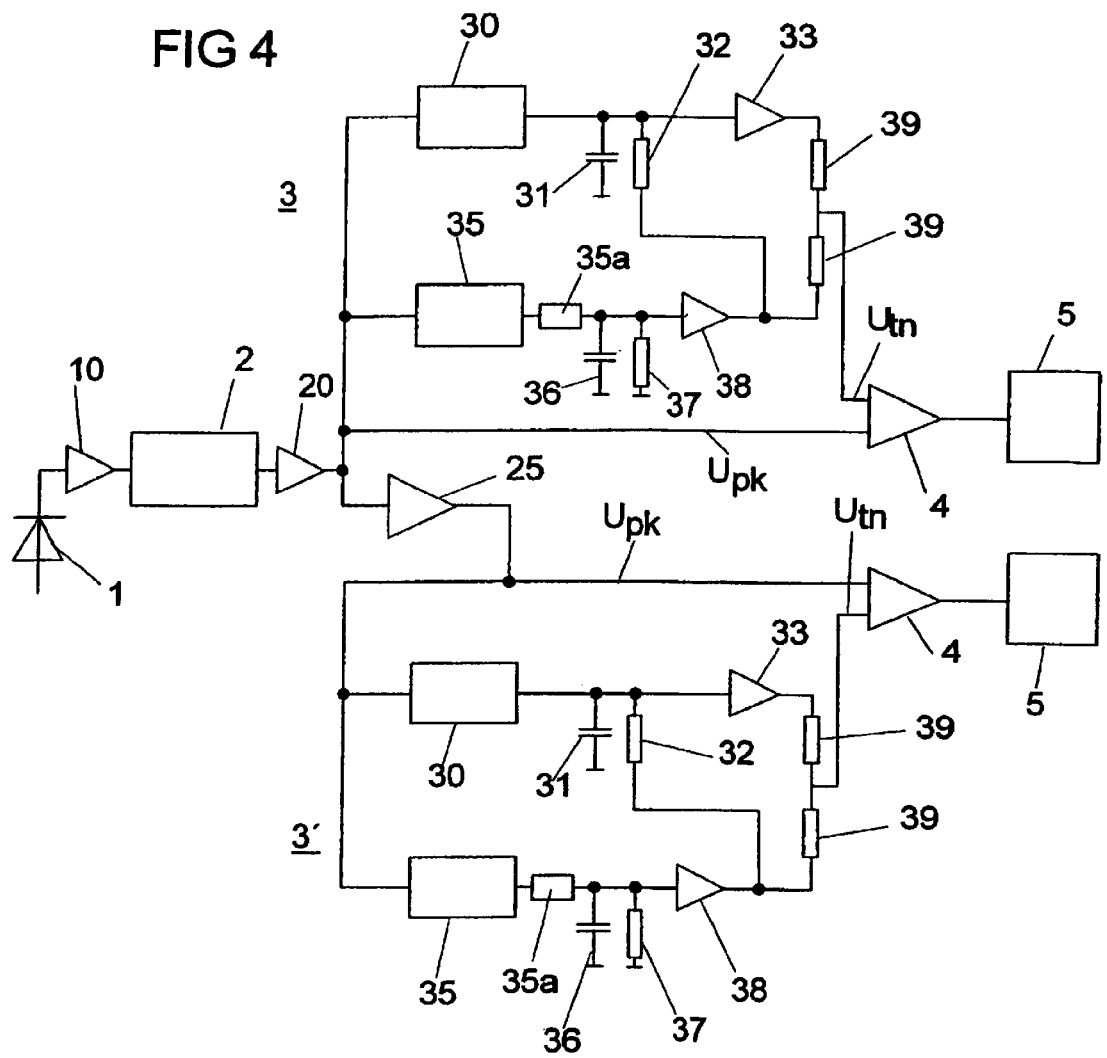
FIG. 4 is a block diagram of the receiving unit illustrated in FIG. 1.

Using the circuit arrangement described on the basis of FIG. 4, the transmitted signals of the probe system described on the basis of FIGS. 1 to 3b are analyzed:

An electric signal, e.g., a voltage signal, is generated by photodiode 3 and downstream amplifier 10 from the IR signals of the probe system, as well as from the present infrared interference signals, which, together, form the received signals of receiving unit E/A, the voltage signals subsequently being differentiated in differentiator 2. This eliminates low-frequency interference, which may originate from fluorescent tubes, for example. When differentiating the initially substantially square-wave voltage signals, voltage peaks (voltage pulses) are generated at the ascending and descending edges of each of the square-wave signals (cf. FIG. 4a).

In this context, the ascending edges effect a positive voltage pulse and descending edges of the transmitted signal a negative voltage pulse of the differentiated signal. The positive and negative voltage pulses 3, 3' are separately analyzed in the two evaluation circuits 3, 3' arranged downstream from differentiator 2, the descending edges or the corresponding voltage pulses of the differentiated signal of evaluation circuit 3' being assigned to the preconnected inverter 25.

Figure 5:
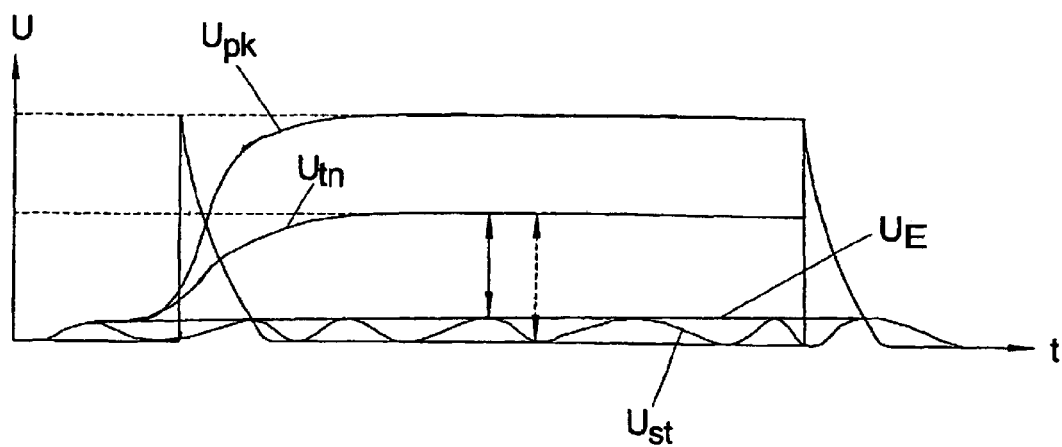
FIG. 5 illustrates a work step used in evaluating the transmitted signals of the probe system in the receiving unit.

FIG. 5 illustrates that by averaging peak values Upk of the differentiated received signal and an effective value (envelope UE) of interference signals Ust, an effective voltage value Utn may be formed, which, as reference voltage, defines the triggering threshold of trigger 4 of the particular evaluation circuit 3, 3'. In this context, FIG. 5 illustrates exemplarily the differentiated signals corresponding to the ascending edge of a start bit, as well as the ascending edge of a stop bit.

Trigger 4 of the particular evaluation circuit 3, 3' recognizes those signals as transmitted signals, whose amplitude exceeds the triggering threshold defined by reference voltage Utn. Because reference voltage Utn is formed by interlinking the peak values of the differentiated received signals, and an envelope of the interference signals, the triggering threshold rises with increasing amplitude of the interference signals. This may substantially eliminate the danger of the particular trigger 4 being falsely tripped because of interference signals, since the triggering threshold is above the envelope of the interference signals.

If, on the other hand, as may be conventional, the triggering threshold were formed by interlinking (averaging) the peak values of the received signals, and the zero potential, then the triggering threshold may be independent of the interference signals and there may be an increased danger of inference signals leading to a spurious tripping of trigger 4.

By interlinking the peak values of the (differentiated) received signals, and an effective value of the interference signals, to form the triggering threshold, as provided by an example embodiment of the present invention, it may be possible to eliminate, e.g., the interference effects of high-frequency interference signals. This furthers the process of eliminating low-frequency interference signals through differentiation of the received signals, as described above, before they are further processed and evaluated.

Those signals which are recognized by trigger 4 of the particular evaluation circuit 3, 3' as edges of the transmitted signals of the probe system, are subsequently evaluated using a shift register 5. In this context, each of the two evaluation circuits 3, 3' has its own assigned shift register 5, so that the voltage pulses attributable to ascending edges and those attributable to descending edges are separately analyzed. It is a question, in this connection, of ascertaining whether a switch-on signal and/or a battery signal occurs between a start bit and a stop bit of a data packet sent by the probe system. Further details in this regard may be inferred from FIGS. 6a and 6b.

FIG. 6a schematically illustrates the two shift registers 5 illustrated in FIG. 4, which are connected downstream from a trigger 4 and are linked to an evaluation logic.

Figure 4A:
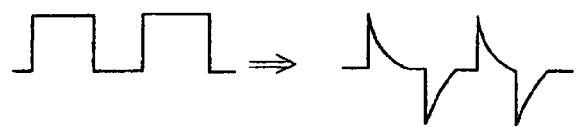
FIG. 4a is a schematic view of the mode of operation of a differentiator element of the circuit arrangement illustrated in FIG. 4.

FIG. 6b schematically illustrates those positive (top) and negative (bottom) voltage pulses of a differentiated data packet which were obtained from the transmitted signals of the probe system. Following the differentiation, the ascending and descending edges of the data packet are each represented by positive or negative voltage pulses, as illustrated in FIG. 4a.

To read data from the data packets to be evaluated into the particular shift register 5, a so-called eight-fold "oversampling" takes place. Thus, the sampling frequency (1/0.4 $\mu s^{-1}$=2,500 kHz) of shift register 5 is eight times the pulse frequency (bit rate of 1/3.2 $\mu s^{-1}$=312.5 kHz) of the transmitted signal. Accordingly, for each data packet 100 to be evaluated, which, at a maximum, has four signal pulses (start bit, stop bit, as well as, in some instances, a switch-on signal and a battery signal), data are read in at seventy-two sampling locations (cf. FIG. 6b). The time interval (0.4 $\mu s$) between two successive processes of inputting into the shift register is thus one seventy-second of the duration of a signal packet 100. In this manner, a high enough accuracy is achieved when evaluating the data packets.

As is discernible on the basis of FIGS. 6a and 6b, the one shift register S is used to determine the position of the ascending edges and the other shift register 5 to determine the position of the descending edges of the data packets. These are each represented in the differentiated output signal by positive and negative signal pulses, respectively.

By evaluating the data packets using the two shift registers 5, it is checked, on the one hand, whether pulses regularly occur in shift register 5, which analyzes the position of the ascending flanks of the data packets, in an interval of fifty-six sampling locations (in accordance with the time interval of the ascending edges of the start and stop signals). Correspondingly, using the other shift register 5, it is analyzed whether pulses occur regularly there in an interval of forty-eight sampling locations (in accordance with the time interval of the descending edges of the start and stop signals)—and whether the first of the two corresponding pulses (descending edge of the start signal) occurs in an interval of sixteen sampling locations from the beginning of the signal (ascending edge of the start signal). If this is the case, the sampling system is in a state of readiness. That is, data packets are regularly sent out which contain at least one start bit and one stop bit.

Thus, the readiness of the probe system is inferred from the position of the signal edges. It is unimportant whether, in addition to the expected signal pulses, still other individual signal pulses are present in an interval of fifty-six and forty-eight sampling locations, respectively, which could be attributed to interference, for example. What is relevant is only that signal pulses are regularly detected in each instance in an interval of fifty-six and forty-eight sampling locations, respectively, (in accordance with an ascending or descending edge). In this context, for each individual signal pulse, a deviation of plus or minus one sampling location is allowed in each instance (consideration of the jitter).

Because the edges of any existing switch-on signal 102 or of any existing battery signal 104 have a defined interval or spacing from the corresponding edges of start and stop signals 101, 105 in each instance, the existence of a switch-on signal 102 or of a battery signal 104 is then also able to be directly deduced from the position of detected pulses of the differentiated signal. Thus, an overall view of FIGS. 3b and 6b reveals that the ascending edge of a switch-on signal is distant by twenty-four sampling locations from the ascending edge of the start bit of the corresponding data packet. A correspondingly fixed relation holds with respect to the position of the descending edge of a possible switching bit with respect to the descending edge of the start bit, etc.

Thus, solely by evaluating the position of the edges of the transmitted signals in the form of data packets generated by the probe system, it is possible to determine whether the probe system is in a state of readiness, as well as whether a switch-on signal (corresponding to a deflection of the probe element) and/or a battery signal (corresponding to a necessary battery replacement) exists.

Figure 7:
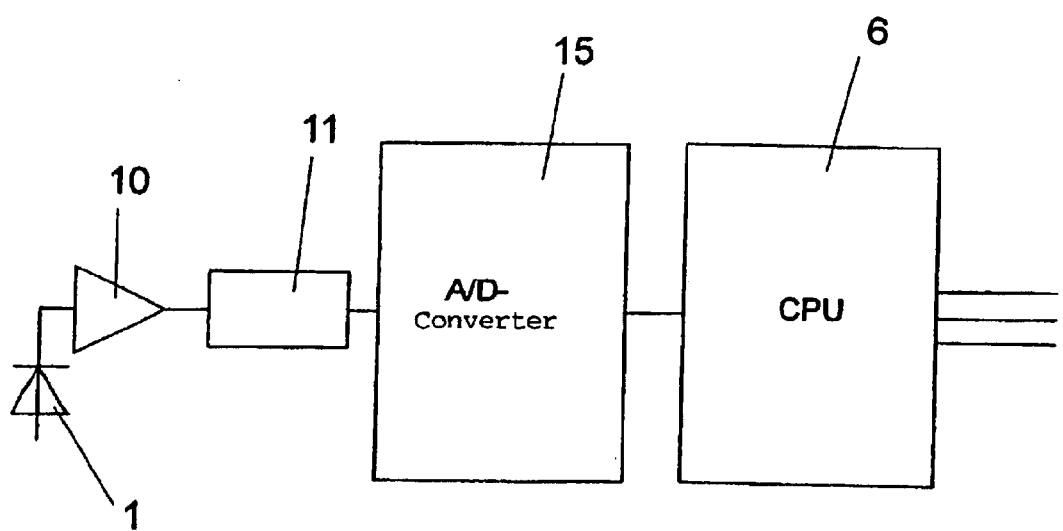
FIG. 7 illustrates a digital circuit as an alternative to the analog circuit arrangement from FIG. 4.

In contrast to the analog circuit arrangement illustrated in FIG. 4, FIG. 7 illustrates a digital design of an arrangement for evaluating the transmitted signals of a probe system, which arrangement may form part of a corresponding receiving unit. This arrangement includes a photodiode 1 having a downstream amplifier 10, filter 11, and analog/digital converter 15. Connected downstream from analog/digital converter 15 is a microprocessor or programmable logic module 6, which, once analog/digital converter 15 converts the voltage signal generated by photodiode 1 and amplifier 10 into digital signals, may assume the entire function of processing and evaluating the signals. All method steps described above on the basis of FIGS. 4 to 6, e.g., differentiating the received signals, distinguishing the transmitted signals of the probe system from interference signals (by comparing the received signals to a reference value formed from the differentiated received signals and an effective value of the interference signals), as well as making the final determination of the position of the edges of each of the pulses of the transmitted signal, may take place in this connection using the microprocessor or programmable logic module 6.

What is claimed is:

1. A method for evaluating transmitted signals of a probe system, the probe system including a probe element deflectable from a rest position, comprising:
   generating the transmitted signals by the probe element, the transmitted signals including a switch-on signal during a deflection of the probe element out of the rest position;
   receiving the transmitted signals and interference signals by a receiver unit;
   generating information signals from the signals received in the receiving step;
   forming a reference signal by interlinking the information signals with the interference signals; and
   comparing the transmitted signals and the interference signals received in the receiving step to the reference signal.

2. The method according to claim 1, wherein the reference signal is formed in the forming step by interlinking the information signals with the interference signals in at least one of an additive process and a subtractive process.

3. The method according to claim 2, wherein the interlinking of the information signals and the interference signals includes a mean value generation.

4. The method according to claim 3, wherein the mean value generation is performed by a voltage divider.

5. The method according to claim 1, wherein the interlinking of the information signals and the interference signals includes linking the information signals to an effective value of the interference signals.

6. The method according to claim 5, further comprising forming the effective value of the interference signals in accordance with an envelope of the interference signals.

7. The method according to claim 6, wherein a capacitor circuit is arranged to form at least one of the effective value of the interference signals and an effective value of the information signals.

8. The method according to claim 1, wherein the interlinking of the information signals and the interference signals includes forming an effective value of the information signals in accordance with an envelope of the signals received in the receiving step.

9. The method according to claim 1, wherein the reference signal is formed in the forming step by at least one of a digital circuit, a programmable logic module and a microprocessor.

10. The method according to claim 1, further comprising differentiating the signals received in the receiving step by time prior to the comparing step.

11. The method according to claim 10, wherein the signals received in the receiving step are differentiated in the differentiating step prior to the reference signal forming step.

12. The method according to claim 10, further comprising generating information signals from the differentiated received signals;
   wherein the reference signal is formed in the forming step by interlinking the information signals with the interference signals.

13. The method according to claim 10, further comprising evaluating signal edges of the differentiated received signals having a positive slope and signal edges of the differentiated received signals having a negative slope by comparison with a reference signal to determine a position of the signal edges.

14. The method according to claim 13, wherein the transmitted signals are generated in the generating step by generating a sequence of signal packets, each signal packet including a start signal and a stop signal, the switch-on signal between the start signal and the stop signal during deflection of the probe element from the rest position, the method further comprising ascertaining occurrence of the start signal, the stop signal and the switch-on signal in accordance with the position of ascending and descending signal edges of the transmitted signals.

15. The method according to claim 10, further comprising, after the differentiating step, processing and evaluating in separate electric circuits, descending and ascending edges of the transmitted signals received in the receiving step.

16. The method according to claim 1, wherein at least one of the transmitted signals and the switch-on signals include substantially square-wave signal pulses.

17. The method according to claim 1, wherein the transmitted signals are generated in the generating step by generating a sequence of signal packets, each signal packet including a start signal and a stop signal, the switch-on signal between the start signal and the stop signal during deflection of the probe element from the rest position.

18. The method according to claim 1, wherein the transmitted signals include electromagnetic signals.

19. The method according to claim 1, wherein the transmitted signals include infrared signals.

20. The method according to claim 1, further comprising further processing transmitted signals received in the receiving step that exceed a signal threshold predefined in accordance with the reference signal.

21. The method according to claim 1, further comprising evaluating the transmitted signals received in the receiving step to determine a position of edges of the transmitted signals following the comparing step performed at a plurality of sampling locations arranged in temporal succession.

22. The method according to claim 21, wherein the sampling locations are arrange in accordance with a periodic sampling signal, a frequency of which is greater than a signal rate of the transmitted signals.

23. The method according to claim 21, wherein the evaluating step is performed by at least one of a semiconductor memory, a shift register, a digital circuit, a microprocessor and a programmable logic module.

24. A system for analyzing received signals in a probe system, the probe system including a measuring probe having a probe element deflectable from a rest position, the measuring probe configured to generate transmitted signals as a function of deflection of the probe element, comprising:
a receiver unit configured to receive the received signals, including the transmitted signals and interference signals;
an arrangement configured to generate information signals from the received signals;
an arrangement configured to interlink the information signals with the interference signals to form a reference signal; and
an arrangement configured to compare the received signals to the reference signal.

25. The system according to claim 24, wherein the arrangement configured to interlink the information signals with the interference signals is configured to interlink the information signals with the interference signals at least one additively and subtractively.

26. The system according to claim 24, wherein the interlink includes mean value generation.

27. The system according to claim 24, wherein the arrangement configured to interlink the information signals with the interference signals is configured to interlink an effective value of the information signals to an effective value of the interference signals.

28. The system according to claim 27, wherein the effective value of the information signals corresponds to peak values of the received signals.

29. The system according to claim 27, wherein the effective value of the interference signals corresponds to an envelope of the interference signals.

30. The system according to claim 24, further comprising a differentiator configured to differentiate the received signals by time, the differentiator connected an input of the arrangement configured to compare the received signals to the reference signal.

31. The system according to claim 30, wherein the differentiator is connected to an input of the arrangement configured to interlink the information signals with the interference signals, the arrangement configured to interlink the information signals with the interference signals configured to interlink differentiated received signals.

32. The system according to claim 24, wherein the receiver unit is configured to receive electromagnetic transmitted signals of the measuring probe, the system further comprising an arrangement configured to convert the electromagnetic received signals into electric signals.

33. The system according to claim 32, wherein the electromagnetic transmitted signals include infrared signals.

34. The system according to claim 32, wherein the arrangement configured to convert the electromagnetic received signals into electric signals includes an optoelectronic component.

35. The system according to claim 32, further comprising an analog circuit configured to process and analyze the received signals connected to an output of the arrangement configured to convert the electromagnetic received signals into electric signals.

36. The system according to claim 32, further comprising a digital circuit configured to process and analyze the received signals connected to an output of the arrangement configured to convert the electromagnetic received signals into electric signals.

37. The system according to claim 36, wherein the digital circuit includes at least one of a programmable logic module and a microprocessor.

38. The system according to claim 24, further comprising an arrangement configured to determine a position of edges of the received signals arranged downstream from the arrangement configured to compare the received signals to the reference signal.

39. The system according to claim 38, wherein the arrangement configured to determine the position of edges of the received signals includes at least one of a shift register, a microprocessor and a programmable logic module.

40. A method for evaluating transmitted signals of a probe system, the probe system including a probe element deflectable from a rest position, comprising:
generating the transmitted signals by the probe element, the transmitted signals including a switch-on signal during deflection of the probe element from the rest position;
receiving the transmitted signals and interference signals by a receiving unit;
differentiating the received signals by time; and
after the differentiating step, comparing the received signals, including the transmitted signals and the interference signals, to a reference signal.

41. The method according to claim 40, wherein the transmitted signals include substantially square-wave signal pulses.

42. The method according to claim 40, wherein the transmitted signals include a sequence of signal packets, each signal packet including a start signal and a stop signal, the switch-on signal between the start signal and the stop signal during deflection of the probe element from the rest position.

43. The method according to claim 40, further comprising:
   determining a position of signal edges by differentiation of the received signals; and
   evaluating signal edges having a positive slop and signal edges having a negative slope by comparison with a reference value.

44. The method according to claim 43, further comprising ascertaining occurrence of the start signal and the stop signal by determining a temporal position of ascending and descending signal edges.

45. The method according to claim 40, wherein the transmitted signals include electromagnetic signals.

46. The method according to claim 45, wherein the electromagnetic signals include infrared signals.

47. The method according to claim 40, further comprising forming the reference signal in accordance with the received signals.

48. The method according to claim 47, wherein the reference signal is formed in the reference signal forming step in accordance with interlinking the differentiated received signals and the interference signal superposed on the transmitted signals.

49. The method according to claim 48, wherein the interlinking of the differentiated received signals includes interlinking the differentiated received signals to an effective value of the interference signals.

50. The method according to claim 49, further comprising forming at least one of the effective value of the interference signals by a capacitor circuit and an effective value of information signals by a capacitor circuit.

51. The method according to claim 48, further comprising generating information signals in accordance with the interlinked differentiated received signals and interference signals.

52. The method according to claim 51, wherein the information signals include components of the differentiated signals made up of differentiated transmitted signals.

53. The method according to claim 48, wherein the interlinking of the differentiated signals and the interference signal to produce the reference signal includes mean value generation performed by a voltage divider.

54. The method according to claim 47, wherein the reference signal is formed in the forming step by at least one of a digital circuit and a programmable logic module.

55. The method according to claim 47, further comprising further evaluating differentiated received signals that exceed a signal threshold predefined in accordance with the received signal.

56. The method according to claim 47, further comprising, after the comparing step, evaluating the differentiated received signals at a plurality of sampling locations arranged in temporal succession to determine a position of edges of the received signals.

57. The method according to claim 56, wherein the sampling locations are arranged in accordance with a periodic sampling signal having a frequency greater than a signal rate of the transmitted signals.

58. The method according to claim 56, wherein the evaluating step is performed in accordance with at least one of a semiconductor memory, a shift register, a digital circuit, a microprocessor and a programmable logic module.

59. The method according to claim 40, further comprising processing and analyzing in separate electric circuits descending and ascending signal edges of the received signals following the differentiating of the received signals.

60. A system for analyzing received signals, comprising:
   a probe system including a measuring probe and a receiver unit, the measuring probe including a probe element that is deflectable from a rest position, the measuring probe configured to generate transmitted signals in accordance with deflection of the probe element, the receiver unit including an arrangement configured to receive the received signals, the received signals including transmitted signals and interference signals, the receiver unit including an arrangement configured to compare the received signals to a reference signal, the receiver unit including a differentiator connected to an input of the arrangement configured to compare the received signals to the reference signal, the differentiator configured to differentiate the received signals by time.

61. The system according to claim 60, wherein the receiver unit is configured to receive electromagnetic received signals of the measuring probe, the receiver unit including an arrangement configured to convert the electromagnetic received signals into electric signals.

62. The system according to claim 61, wherein the electromagnetic received signals include infrared signals.

63. The system according to claim 61, wherein the arrangement configured to convert the electromagnetic signals into electric signals includes an optoelectronic component.

64. The system according to claim 61, further comprising an analog circuit configured to process and analyze the received signals connected to an output of the arrangement configured to convert the electromagnetic signals into electric signals.

65. The system according to claim 61, further comprising a digital circuit configured to process and analyze the received signals connected to an output of the arrangement configured to convert the electromagnetic signals into electric signals.

66. The system according to claim 65, wherein the digital circuit includes at least one of a programmable logic module and a microprocessor.

67. The system according to claim 60, further comprising an arrangement configured to interlink the differentiated received signals and interference signals superposed on the received signal to form the reference signal.

68. The system according to claim 67, wherein the interlink includes mean value generation.

69. The system according to claim 60, further comprising an arrangement configured to determine a position of edges of the received signals arranged downstream from the arrangement configured to compare the received signals to the reference signal.

70. The system according to claim 69, wherein the arrangement configured to determine the position of edges of the received signals includes at least one of a shift register, a microprocessor and a programmable logic module.

* * * * *